US008265975B2

(12) United States Patent
Kofman et al.

(10) Patent No.: US 8,265,975 B2
(45) Date of Patent: Sep. 11, 2012

(54) ADAPTIVE PROJECT BASED PRACTICE SELECTION SCHEMES IN A COMPUTING ENVIRONMENT

(75) Inventors: Alexander Kofman, Haifa (IL); Per Johan Kroll, Haifa (IL); Avi Yaeli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 12/550,413

(22) Filed: Aug. 31, 2009

(65) Prior Publication Data

US 2011/0054963 A1  Mar. 3, 2011

(51) Int. Cl.
*G06F 17/00* (2006.01)
(52) U.S. Cl. .................................................... 705/7.13
(58) Field of Classification Search .................. 705/7.13
See application file for complete search history.

(56) References Cited

U.S. PATENT DOCUMENTS 4,992,940 A * 2/1991 Dworkin ................. 705/26.8
2009/0217234 A1 * 8/2009 Chen ........................... 717/101

FOREIGN PATENT DOCUMENTS

WO   WO 2009/055814   *  1/2009

OTHER PUBLICATIONS

Pete Haumer, "RMC 7.5: New and Noteworthy", IBM, 2008 http://blog.haumer.net/resources/rmc-75-new-and-noteworthy.

* cited by examiner

*Primary Examiner* — Thomas Dixon
(74) *Attorney, Agent, or Firm* — F. Jason Far-hadian; Century IP Group (57) ABSTRACT

A practice selection method is provided. The method comprises recording first information describing one or more characteristics of a first project in at least one storage medium; determining whether a first practice is likely to have a successful impact on the first project based on the first information; and suggesting the first practice, in response to determining that the first practice is likely to have a successful impact on the first project. The first information may comprise subjective and objective information and may also be used to select a second practice for a second project.

18 Claims, 6 Drawing Sheets

ADAPTIVE PROJECT BASED PRACTICE SELECTION SCHEMES IN A COMPUTING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The present disclosure is directed to facilitating the selection of best practices for a project.

SUMMARY

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a practice selection method is provided. The method comprises recording first information describing one or more characteristics of a first project in at least one storage medium; determining whether a first practice is likely to have a successful impact on the first project based on the first information; and suggesting the first practice, in response to determining that the first practice is likely to have a successful impact on the first project. The first information may comprise subjective and objective information and may also be used to select a second practice for a second project.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

One or more individuals may collaborate as a team on a project. A project refers to any formal or informal endeavor undertaken to achieve a set of goals or objectives. Thus, a project may be directed to software, systems delivery and operations, products, services, businesses, or organizations, for example. Part of such collaborated effort by a team may include the adoption of one or more practices. A practice refers to a way, a method, a technique, process, activity, incentive, or organizational structure that may be utilized to achieve a desired outcome or business function.

Selecting best practices (i.e., optimal practices) for a project may increase the success rate of a project. Unfortunately, existing practice selection schemes implement selection of practices for a project utilizing limited information. As a result, the selected practices may not be the best practices.

In the practice selection schemes provided below, both subjective and objective information about a project may be utilized to select a practice for the project. Further, information associated with other projects, in addition to information associated with the current project, may be utilized to select a practice for the current project. That is, practices may be selected based on different types of information and practice adoption or modification experiences of other projects. As a result, the selected practices may be the best practices available.

Figure 1:
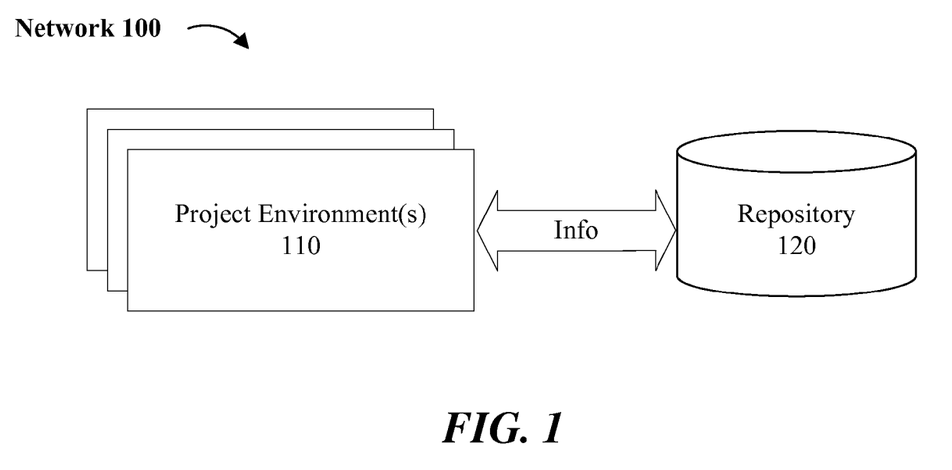
FIG. 1 illustrates an exemplary network, in which one or more teams may collaborate on one or more projects, respectively, in accordance with one or more embodiments.

Referring to FIG. 1, in accordance with one or more embodiments, one or more teams may collaborate on one or more projects, respectively, in an exemplary network 100. Network 100 comprises one or more project environments 110 connected to a repository 120. In one embodiment, the project environments 110 may comprise an automated environment within which a team may collaborate on a software development project, for example.

Each project environment 110 may comprise one or more computing systems (not shown) through which a team may collaborate on a project. The repository 120 may comprise one or more data storage mediums. The repository 120 may store information received from the project environments 110. The repository 120 may also provide information received from one project environment 110 to another project environment 110.

Figure 2:
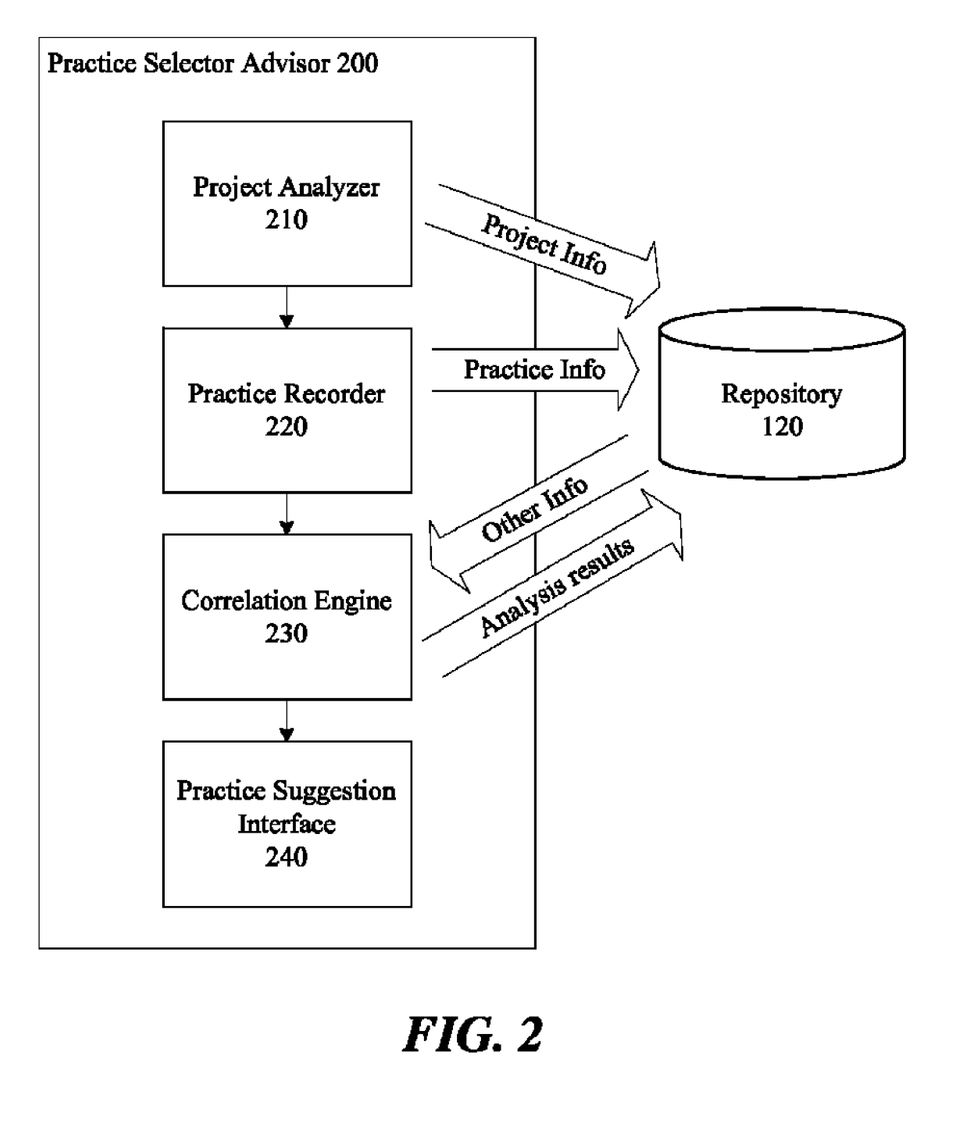
FIG. 2 illustrates an exemplary practice selection advisor, in accordance with one or more embodiments.

Referring to FIGS. 1 and 2, in accordance with one embodiment, a team that is collaborating on a project in the network 100 may utilize a practice selection advisor 200 to select one or more practices for the project. Desirably, the practice selection advisor 200 automatically suggests the right practices at the right time, as provided in more detail below.

The practice selection advisor 200 comprises an adaptive, self learning system including a project analyzer 210, a practice recorder 220, a correlation engine 230, and a practice suggestion interface 240, without limitation. Each component may be implemented in the form of hardware, software, or a combination of hardware and software as part of one or more operational modules. The operational modules may be implemented over one or more computing systems in the network 100.

The project analyzer 210 may collect subjective information (e.g., a completed questionnaire) or objective information (e.g., a metric, statistic, or other measurement or observation) defining one or more relevant characteristics of a project. The project analyzer 210 may also record the project information in the repository 120 so that the project information may be utilized to select practices for other projects in the network 100.

Depending on implementation, the project information may include one or more issue indicators, contextual factors, or success indicators. An issue indicator may provide information about an issue or problem associated with the project. A contextual factor may provide information about an organizational structure, a project phase, a project dynamic, maturity of an existing practice, skill of an individual project team member, a cultural nuance, a value taxonomy, or other context of the project. A success indicator may provide information about the impact (e.g., success or failure) of a particular practice on the project.

The practice recorder 220 may detect adoption or modification of a practice for a project. The practice recorder 220 may also record information associated with the adoption or modification of the practice in the repository 120 so that the practice information may be utilized to select practices for other projects in the network 100. In one implementation, for example, the practice information may include the date that a particular practice is adopted for the project.

The correlation engine 230 may perform a correlation analysis to identify one or more practices that are likely to have a successful impact on a project. The correlation engine 230 may also record the results of the correlation analysis in the repository 120 so that the results may be utilized to select practices for other projects in the network 100.

The correlation analysis may comprise comparing different types of information recorded in the repository 120 for the current project to different types of information recorded in the repository 120 for other projects in the network 100. In one implementation, for example, the correlation engine 230 may identify a practice adopted for another project if the practice had a successful impact on the other project and the other project has issue or contextual similarities to the current project.

The practice suggestion interface 240 may suggest the practices selected by the correlation engine 230 to a user (e.g., a human user or another application). In one implementation, the practices are automatically identified and suggested to the user, in response to a triggering event (e.g., detecting a new project in the network 100 or detecting a new issue associated with an existing project). Alternatively, the practices are identified and suggested to the user on-demand, in response to a direct request by the user.

Figure 3:
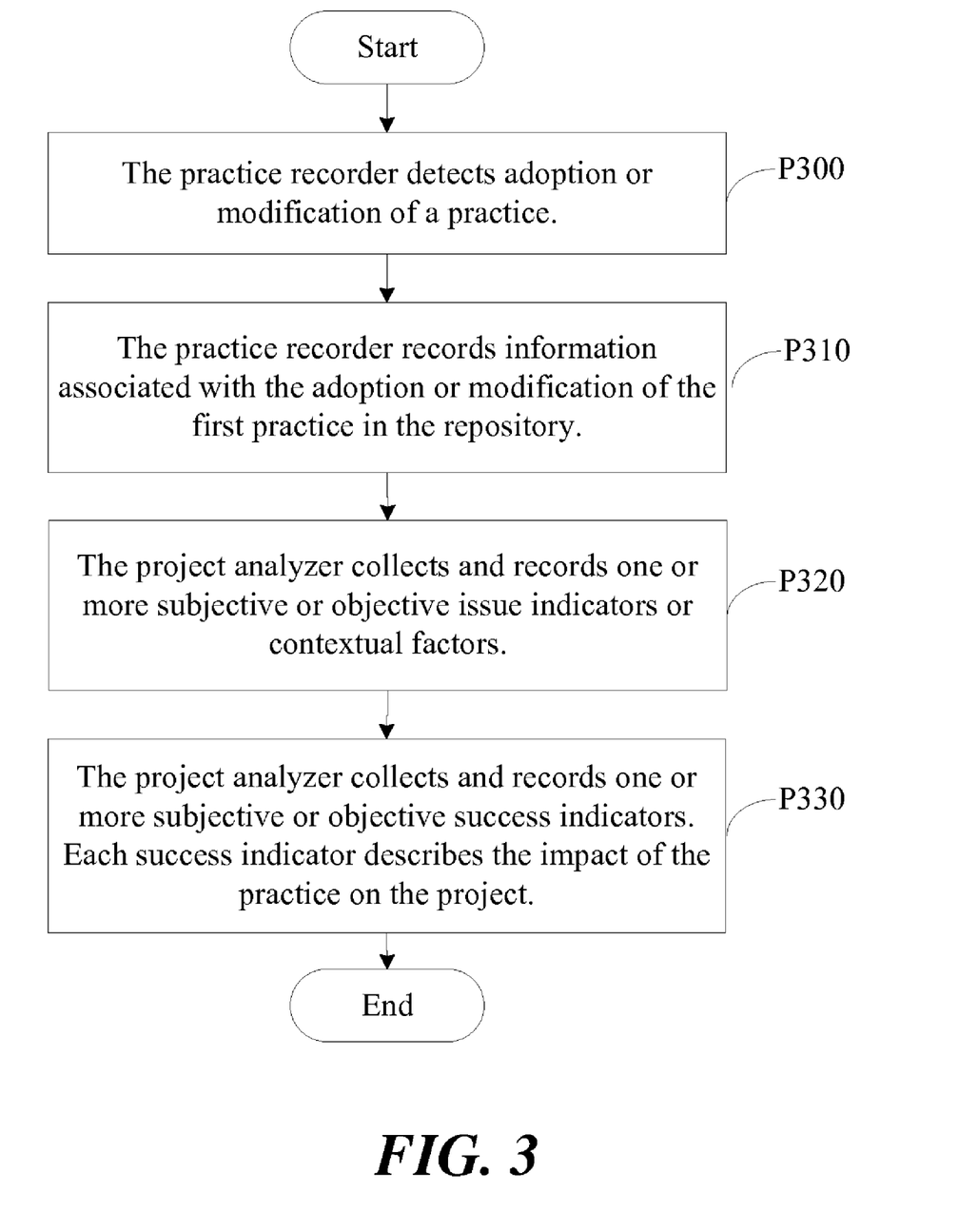
FIG. 3 is a flow diagram of a method for recording information, in accordance with one embodiment.

Referring to FIGS. 2 and 3, in accordance with one embodiment, the practice selection advisor 200 may record information in the repository 120. It is noteworthy that the ability of the practice selection advisor 200 to suggest best practices for a project may improve as more information is recorded in the repository 120. That is, suggestions may improve as more information about previous practice adoption or modification experiences becomes available.

Upon detecting adoption or modification of a practice for a project (P300), the practice recorder 220 records information associated with the adoption or modification of the practice in the repository 120 (P310). Additionally, at approximately the same time, before or after, the project analyzer 210 collects and records one or more subjective or objective issue indicators and contextual factors in the repository 120 (P320). Upon recording the issue indicators and the contextual factors, the project analyzer 210 collects and records one or more subjective or objective success indicators in the repository 120. Each success indicator provides information about the impact of the practice on the project (P330).

Figure 4:
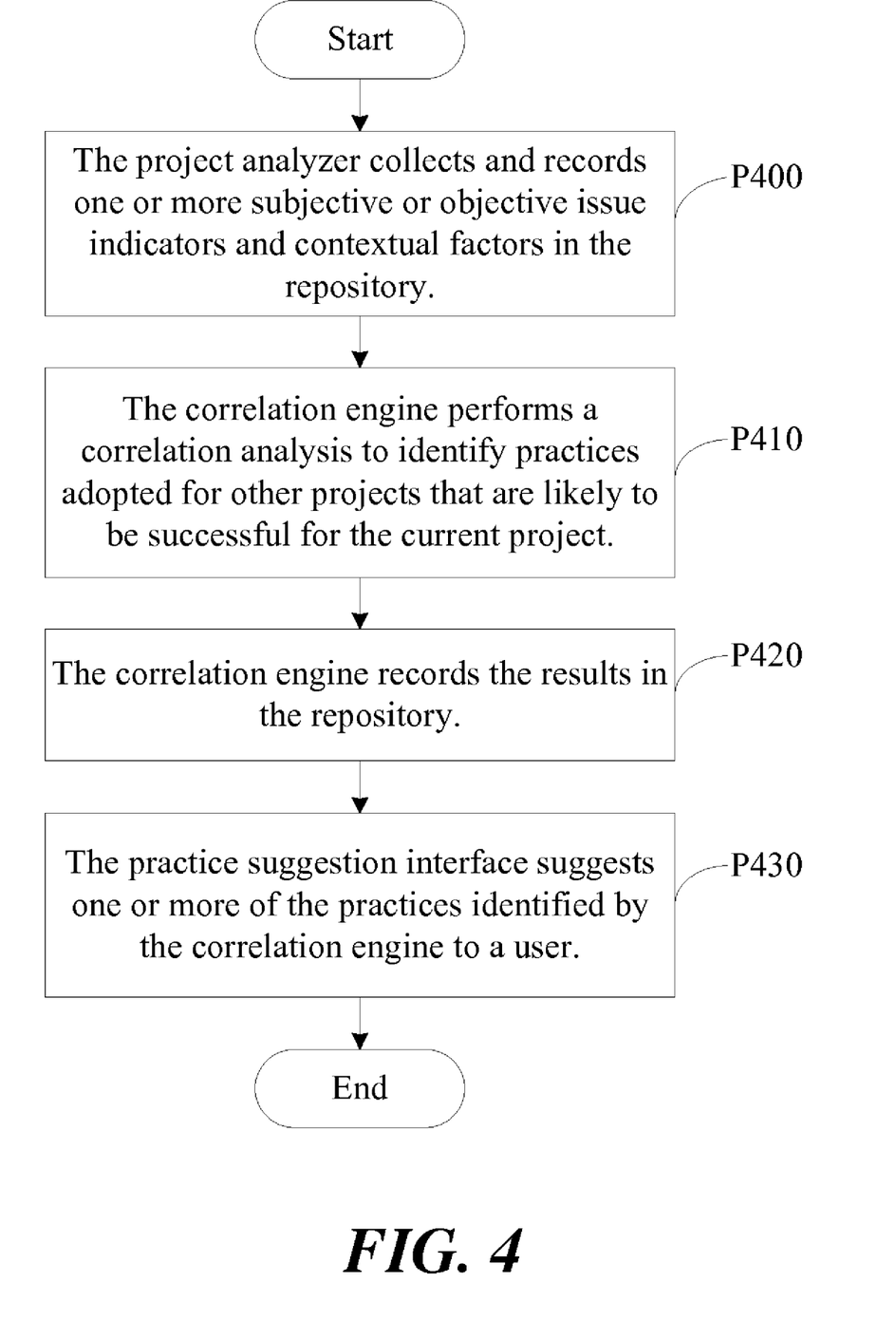
FIG. 4 is a flow diagram of a method for selecting a practice for a project, in accordance with one embodiment.

Referring to FIGS. 2 and 4, in accordance with one embodiment, the practice selection advisor 200 may suggest one or more practices for a project.

The project analyzer 210 collects and records one or more subjective or objective issue indicators and contextual factors in the repository 120 (P400). Once the issue indicators and the contextual factors are recorded, the correlation engine 230 performs a correlation analysis to identify practices adopted for other projects that are likely have a successful impact on the current project (P410). Upon performing the correlation analysis, the correlation engine 230 records the results in the repository 120 (P420), and the practice suggestion interface 240 suggests one or more of the practices identified by the correlation engine to a user (P430).

Depending on implementation, the systems and methods provided above may support one or more of the following features: selection of practices that are best suited to a project with respect to context, problems, or team capabilities; small or contextualized but effective modification of adopted practices; an on-demand mechanism for practice selection; an automatic mechanism for practice selection; sharing project or practice information across multiple projects in a network; or preventing adoption of ineffective practices that may lead to project failure, slow development, increased expenses, or revenue loss.

In different embodiments, the claimed subject matter may be implemented either entirely in the form of hardware or entirely in the form of software, or a combination of both hardware and software elements. For example, the practice selection advisor 200 may be implemented on one or more controlled computing system environments that may be presented largely in terms of hardware components and software code executed to perform processes that achieve the results contemplated by the system of the claimed subject matter.

Figure 5:
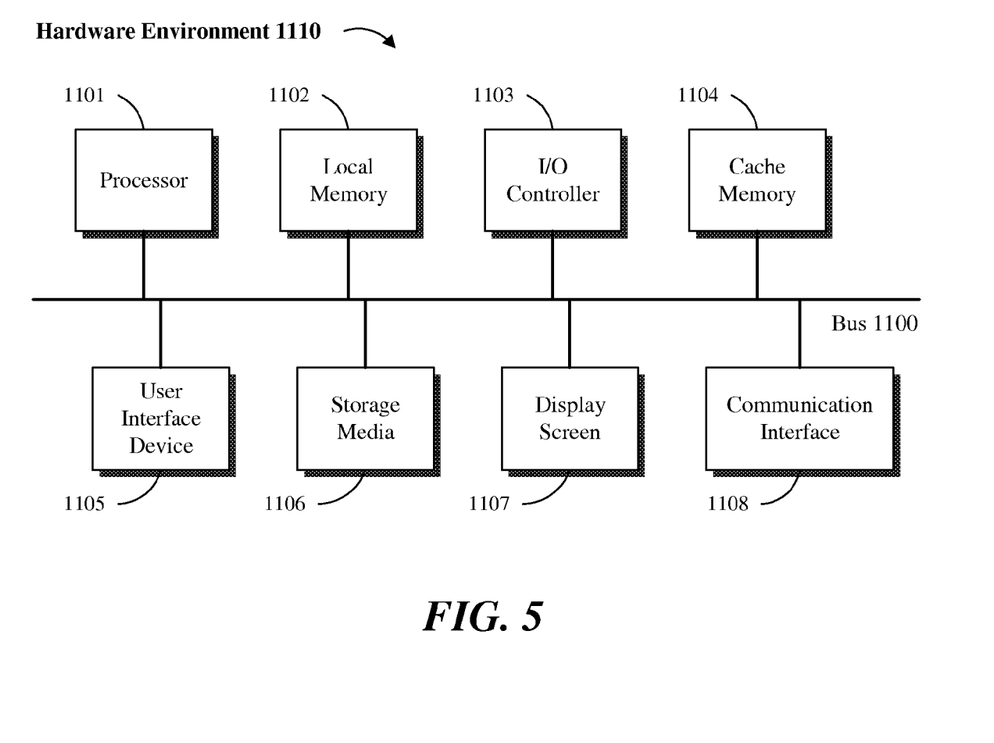
FIGS. 5 and 6 are block diagrams of hardware and software environments in which the claimed subject matter may be implemented, in accordance with one or more embodiments.
Figure 6:
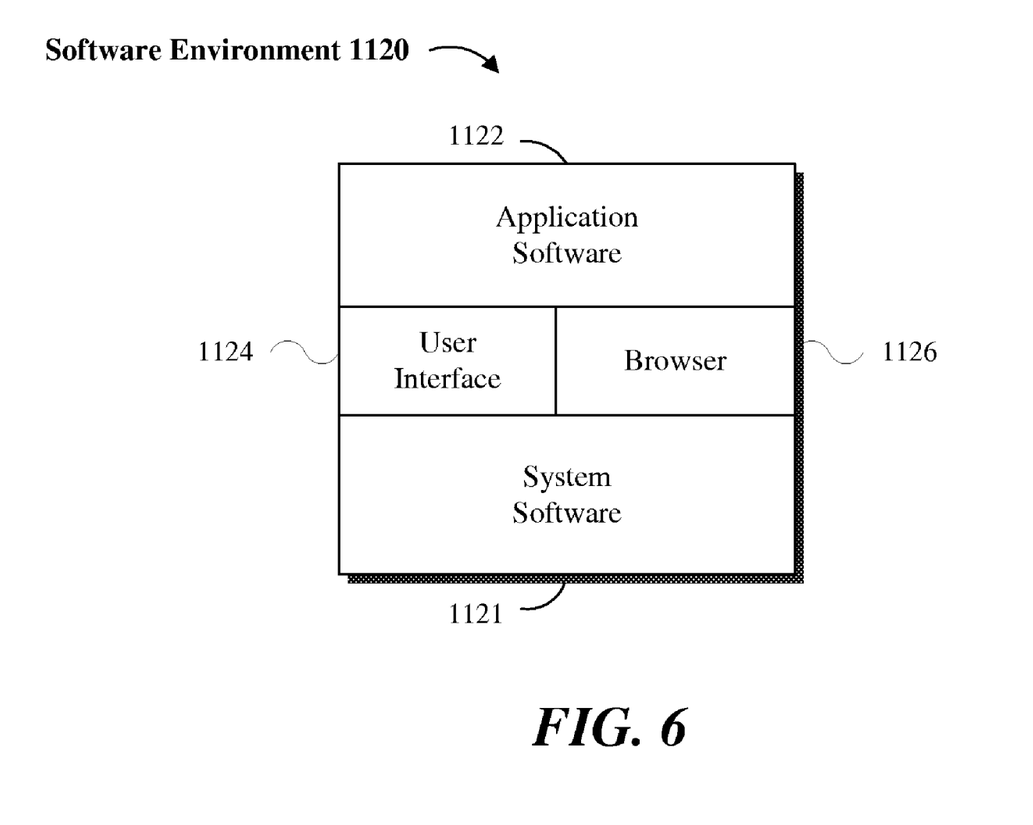

Referring to FIGS. 5 and 6, a computing system environment in accordance with an exemplary embodiment is composed of a hardware environment 1110 and a software environment 1120. The hardware environment 1110 comprises the machinery and equipment that provide an execution environment for the software; and the software environment 1120 provides the execution instructions for the hardware as provided below.

As provided here, software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, the practice selection advisor 200 may be implemented as system software 1121 or application software 1122 executed on one or more hardware environments to facilitate selection of practices for a project.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 5, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 6, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a general computing system (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A practice selection method comprising:

recording, in a data storage medium, first information describing one or more characteristics of a first project in at least one storage medium, wherein the first information includes one or more issue indicators or contextual factors that provide subjective or objective data about the first project, wherein information about success or failure of application of one or more previously tested practices to other projects is accessible based on one or more success indicators associated with said previously tested practices in view of contexts and issues associated with the other projects;

determining, using one or more processors, whether a first practice selected from among said one or more previously tested practices is likely to have a successful impact on the first project based on an analysis of context or issue data included in the first information; and suggesting the first practice, in response to determining that the first practice is likely to have a successful impact on the first project, wherein success results for the application of the first practice to the first project is recorded in a repository in view of context and issue data in the first information.

2. The method of claim 1, wherein the issue indicators comprise information about a problem associated with the first project, and the contextual factors comprise at least one of organizational structure, project phase, project dynamic, maturity of an existing practice, skill of an individual project team member, a cultural nuance, a value taxonomy.

3. The method of claim 1, further comprising:
  detecting adoption or modification of the first practice for a second project; and
  recording second information describing the adoption or modification of the first practice in the at least one storage medium.

4. The method of claim 3, further comprising recording third information describing one or more characteristics of the second project in the at least one storage medium.

5. The method of claim 4, further comprising recording fourth information describing impact of the first practice on the second project in the at least one storage medium.

6. The method of claim 5, wherein the determining is performed using correlation analysis on at least one of the first information and at least one of the second, third, or fourth information.

7. The method of claim 6, wherein at least one of the recording of the first information, the determining, the suggesting, the detecting, the recording of the second information, the recording of the third information, or the recording of the fourth information is performed automatically.

8. A practice selection system comprising:
  one or more processors;
  a project analyzer for recording first information describing one or more characteristics of a first project in at least one storage medium, wherein the first information includes one or more issue indicators or contextual factors that provide subjective or objective data about the first project,
  wherein information about success or failure of application of one or more previously tested practices to other projects is accessible based on one or more success indicators associated with said previously tested practices in view of contexts and issues associated with the other projects;
  a correlation engine for determining whether a first practice selected from among said one or more previously tested practices is likely to have a successful impact on the first project based on an analysis of context or issue data included in the first information; and
  a practice suggestion interface for suggesting the first practice, in response to determining that the first practice is likely to have a successful impact on the first project, wherein success results for the application of the first practice to the first project is recorded in a repository in view of context and issue data in the first information.

9. The system of claim 8, wherein the issue indicators comprise information about a problem associated with the first project, and the contextual factors comprise at least one of organizational structure, project phase, project dynamic, maturity of an existing practice, skill of an individual project team member, a cultural nuance, a value taxonomy.

10. The system of claim 8, further comprising a practice recorder for detecting adoption or modification of the first practice for a second project, wherein the practice recorder records second information describing the adoption or modification of the first practice in the at least one storage medium.

11. The system of claim 10, wherein the project analyzer records third information describing one or more characteristics of the second project in the at least one storage medium.

12. The system of claim 11, wherein the project analyzer records fourth information describing impact of the first practice on the second project in the at least one storage medium.

13. The system of claim 12, wherein the correlation engine determines whether the first practice is likely to have a successful impact on the first project using correlation analysis on at least one of the first information and at least one of the second, third, or fourth information.

14. The system of claim 8, wherein at least one of the first or second projects is a software development project.

15. The system of claim 8, wherein at least one of the first or second projects is a service delivery project.

16. The system of claim 8, wherein at least one of the first or second projects is a business operations project.

17. The system of claim 8, wherein the system is self-learning.

18. A computer program product comprising a non-transitory data storage medium having logic code stored thereon, wherein the logic code when executed on a computer causes the computer to:
  record first information describing one or more characteristics of a first project in at least one storage medium, wherein the first information includes one or more issue indicators or contextual factors that provide subjective or objective data about the first project,
  wherein information about success or failure of application of one or more previously tested practices to other projects is accessible based on one or more success indicators associated with said previously tested practices in view of contexts and issues associated with the other projects;
  determine whether a first practice selected from among said one or more previously tested practices is likely to have a successful impact on the first project based on an analysis of context or issue data included in the first information; and
  suggest the first practice, in response to determining that the first practice is likely to have a successful impact on the first project, wherein success results for the application of the first practice to the first project is recorded in a repository in view of context and issue data in the first information.

\* \* \* \* \*